(12) United States Patent
Oddsen, Jr. et al.

(10) Patent No.: US 7,604,210 B2
(45) Date of Patent: Oct. 20, 2009

(54) TILTER APPARATUS HAVING BIAS ASSEMBLY

(75) Inventors: Odd N. Oddsen, Jr., Easton, PA (US); Bradley A. Derry, Emmaus, PA (US)

(73) Assignee: Innovative Office Products, Inc., Easton, PA (US)

(*) Notice: Subject to any disclaimer, the term of this patent is extended or adjusted under 35 U.S.C. 154(b) by 635 days.

(21) Appl. No.: 10/948,597

(22) Filed: Sep. 23, 2004

(65) Prior Publication Data

US 2006/0060735 A1 Mar. 23, 2006

(51) Int. Cl.
*E04G 3/00* (2006.01)
(52) U.S. Cl. .................... 248/280.11; 248/917; 248/923
(58) Field of Classification Search ................ 248/371, 248/372.1, 919, 921–923; 16/280, 295, 285, 16/297
See application file for complete search history.

(56) References Cited

U.S. PATENT DOCUMENTS

| | | | |
|---|---|---|---|
| 3,463,520 A * | 8/1969 | Turro ........................ 403/362 |
| 3,822,848 A | 7/1974 | Hopkins |
| 3,862,734 A | 1/1975 | Buchin et al. |
| 4,447,031 A | 5/1984 | Souder et al. |
| 4,516,751 A | 5/1985 | Westbrook |
| 4,768,744 A | 9/1988 | Leeds et al. |
| 4,774,961 A | 10/1988 | Carr |
| 4,836,478 A | 6/1989 | Sweere |
| 4,944,481 A | 7/1990 | Yurchenco |
| 5,007,608 A | 4/1991 | Carroll, Jr. |
| 5,108,061 A | 4/1992 | Vlasak |
| 5,183,162 A | 2/1993 | Ritzenthaler |
| 5,231,734 A | 8/1993 | Rude |
| 5,240,215 A | 8/1993 | Moore |
| 5,240,218 A | 8/1993 | Dye |
| 5,435,515 A | 7/1995 | Digiulio et al. |
| 5,503,491 A | 4/1996 | Lu |
| 5,566,048 A | 10/1996 | Esterberg et al. |
| 5,570,498 A | 11/1996 | Hipkiss et al. |
| 5,799,917 A | 9/1998 | Li |
| 5,894,633 A | 4/1999 | Kaneko et al. |
| 6,019,332 A | 2/2000 | Sweere et al. |
| 6,092,264 A | 7/2000 | Banks |
| 6,189,849 B1 | 2/2001 | Sweere et al. |
| 6,286,794 B1 | 9/2001 | Harbin |
| 6,347,433 B1 | 2/2002 | Novin et al. |
| 6,354,549 B2 | 3/2002 | Sweere et al. |
| 6,488,599 B2 | 12/2002 | Nye |
| 6,505,988 B1 | 1/2003 | Oddsen, Jr. |
| 6,530,122 B1 | 3/2003 | Kondou et al. |
| 6,532,628 B2 * | 3/2003 | Kim ........................... 16/342 |
| 6,584,646 B2 | 7/2003 | Fujita et al. |
| 6,665,906 B2 * | 12/2003 | Li ............................... 16/330 |
| 6,666,422 B1 * | 12/2003 | Lu et al. .................. 248/291.1 |

(Continued)

*Primary Examiner*—Amy J. Sterling
*Assistant Examiner*—Steven Marsh
(74) *Attorney, Agent, or Firm*—Design IP

(57) ABSTRACT

A tilter assembly is provided for positioning an electronic device such as a flat panel display. The tilter assembly includes a tilter head having an opening aligned along an axis and a tilter bar received within the opening. The tilter head is rotatable about the axis, and may be coupled to a support. The tilter assembly also includes a spring, such as a torsion spring, coupled to the tilter bar to provide a bias or counterbalance to the electronic device, thereby preventing undesired movement of the electronic device.

9 Claims, 21 Drawing Sheets

U.S. PATENT DOCUMENTS

| | | |
|---|---|---|
| 6,698,063 B2 * | 3/2004 | Kim et al. ............... 16/337 |
| 6,779,234 B1 * | 8/2004 | Lu et al. ............... 16/340 |
| 7,048,242 B2 | 5/2006 | Oddsen, Jr. |
| 7,063,296 B2 * | 6/2006 | Williams ............... 248/285.1 |
| 7,147,191 B2 * | 12/2006 | Ichikawa et al. ....... 248/292.12 |
| 7,177,144 B2 | 2/2007 | Ha et al. |
| 2004/0245419 A1 | 12/2004 | Sweere et al. |
| 2004/0251389 A1 | 12/2004 | Oddsen, Jr. |
| 2006/0197003 A1 | 9/2006 | Oddsen, Jr. |

* cited by examiner

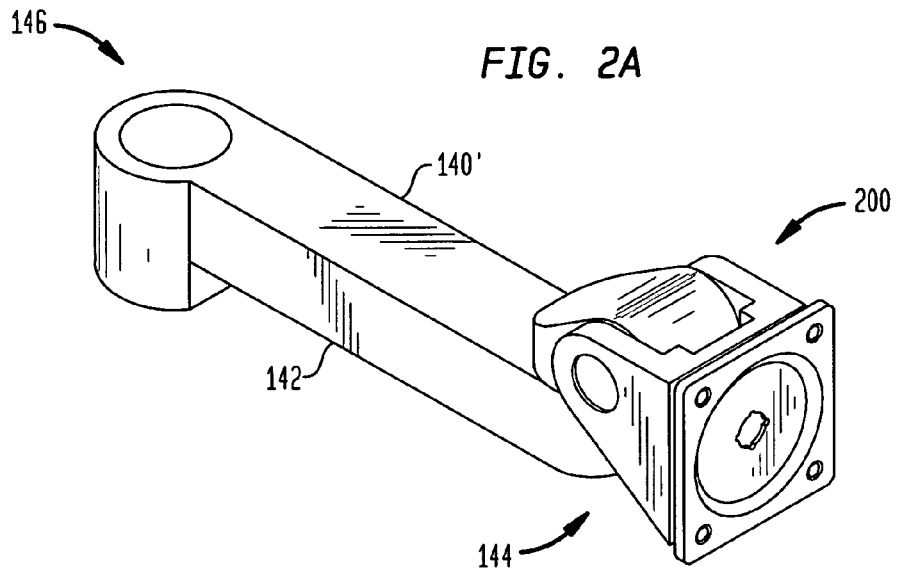
FIG. 2A
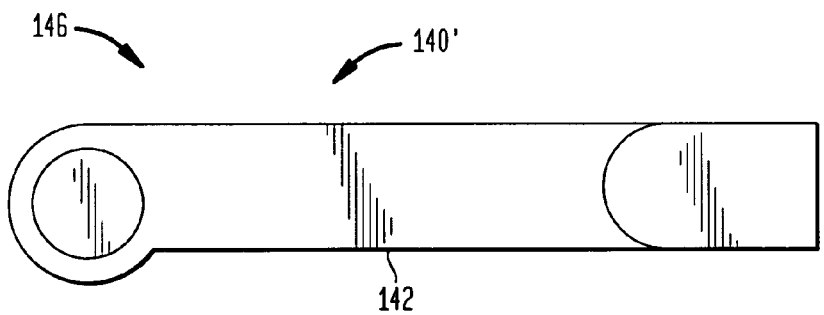
FIG. 2B
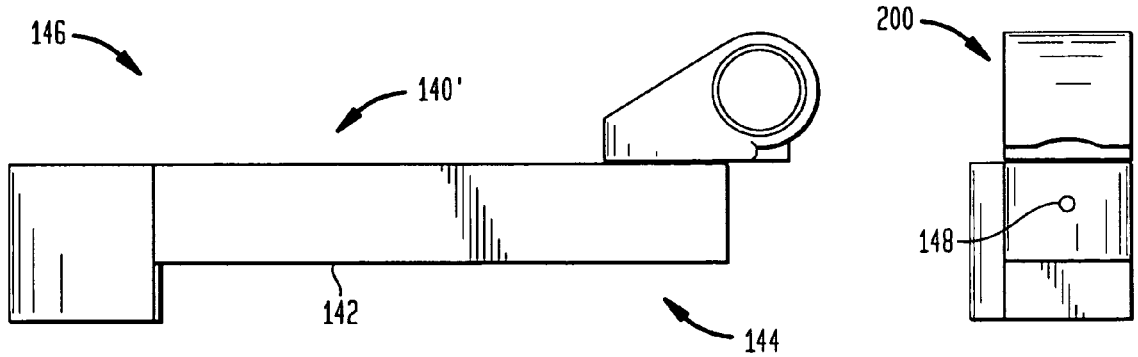
FIG. 2C
FIG. 2D

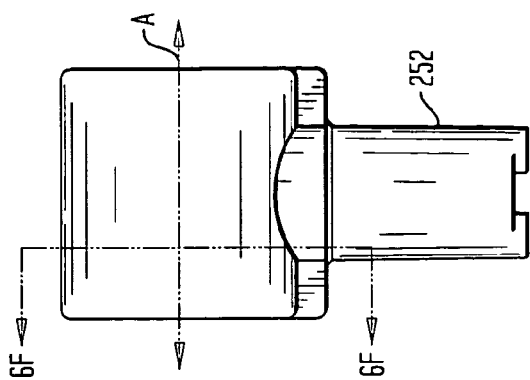
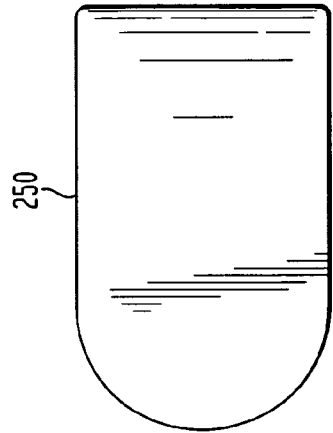
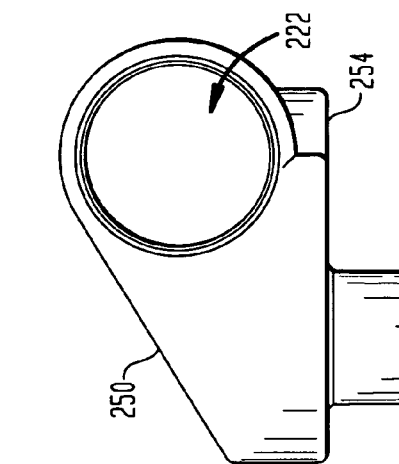
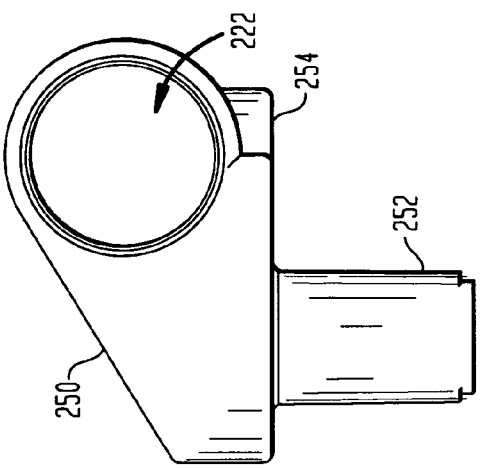
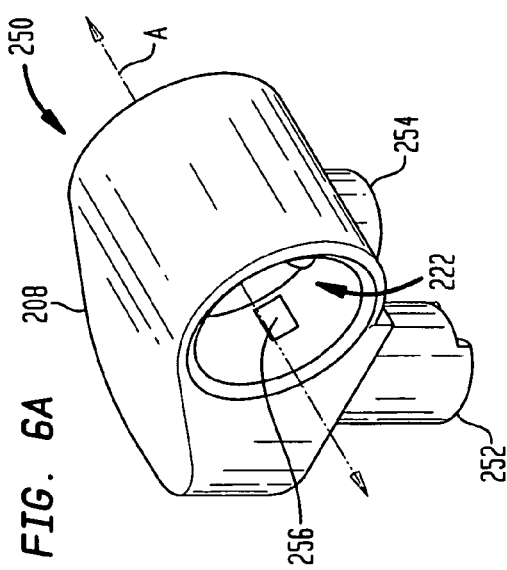
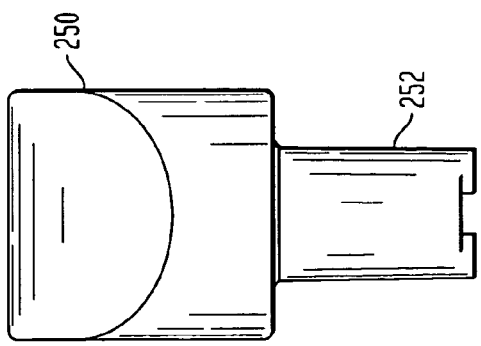

TILTER APPARATUS HAVING BIAS ASSEMBLY

BACKGROUND OF THE INVENTION

The present invention relates to a tilter apparatus for positioning electronic devices. More particularly, the present invention relates to a tilter apparatus having a bias assembly for adjustably positioning an electronic device such as a flat panel display.

In the past people have placed video monitors and other electronic equipment on desks, tabletops, or upon other equipment such as personal computers or workstations. One drawback to these configurations is the reduction in available workspace taken up by the equipment. Another drawback is the inability to place the equipment in a desired location. A further drawback is the potential for eye strain, neck strain and/or a cumulative trauma disorder such as carpel tunnel syndrome from poor placement of devices such as monitors and keyboards.

Different solutions have been provided in order to overcome these obstacles. For example, in one solution, a monitor stand or printer stand elevates the apparatus over other equipment on a desk. While this may free up workspace, it often places the equipment in an undesirable location. Another solution employs a mechanical extension arm to support the monitor. Extension arms free up workspace and allow users to place the equipment where it is wanted. One such extension arm is shown and described in U.S. Pat. No. 6,478,274, entitled "Arm Apparatus for Mounting Electronic Devices," which is fully incorporated by reference herein. Another type of extension arm is shown and described in U.S. Pat. No. 6,409,134, entitled "Arm Apparatus For Mounting Electronic Devices With Cable Management System," which is fully incorporated by reference herein.

It is often desirable to obtain additional freedom of movement beyond that provided by the extension arm. A tilting device can be used to accomplish this goal. The tilting device connects between the extension arm and the equipment, allowing the equipment to rotate about one or more axis. One such tilting device is shown and described in U.S. Pat. No. 6,505,988, entitled "Tilter for Positioning Electronic Devices," which is fully incorporated by reference herein.

Such tilter devices may not be able to support very heavy and/or bulky equipment, such as large screen monitors. Therefore, a need exists for tilting devices to address this concern. One solution employs springs to provide a counterbalance for the weight of the equipment. Tilter devices employing springs are shown and described in U.S. patent application Ser. No. 10/461,637, filed on Jun. 13, 2003 and entitled "Tilter Apparatus for Electronic Device Having Bias Assembly," which is fully incorporated by reference herein. However, it is desirable to provide alternative spring-biased tilter devices that can support a wide range of weights and can be easily and economically manufactured.

SUMMARY OF THE INVENTION

In accordance with an embodiment of the present invention, a tilting apparatus for supporting a device is provided. The tilting apparatus comprises a tilter head, a tilter bar and a torsion spring component. The tilter head has an opening aligned along an axis. The tilter bar is received within the opening and is rotatable about the axis. The tilter bar also includes a connection. The torsion spring component is coupled between the connection of the tilter bar and the tilter head.

In one alternative, the tilting apparatus further comprises means for coupling the tilting apparatus to the electronic device. In another alternative, the tilting apparatus further comprises a locking mechanism for preventing rotation of the tilter bar about the axis. In a further alternative, the tilting apparatus further comprises a bushing received within the opening and at least partly enclosing the tilter bar. In this case, the tilting apparatus may further comprise a set screw threadedly coupled with the tilter head. Here, the bushing includes a slot, and when the set screw engages the bushing, the set screw compresses the bushing against the tilter bar to limit rotation of the tilter bar about the axis.

In another alternative, the torsion spring component comprises a first torsion spring and a second torsion spring, the connection of the tilter bar comprises a first connection and a second connection, the first torsion spring is coupled between the first connection and the tilter head, and the second torsion spring is coupled between the second connection and the tilter head. In this case, the first and second torsion springs preferably comprise wound springs wound in opposite directions. The first and second torsion springs may each have a first tang and a second tang. Here, the first tang of the first torsion spring is coupled to the first connection of the tilter bar, and the first tang of the second torsion spring is coupled to the second connection of the tilter bar. The first and second torsion springs may each includes less than five turns.

In a further alternative, the tilting apparatus further comprises a tilter cap, which is connectable to the torsion spring component. In this case, the tilting apparatus preferably further comprises a tilter mount for connecting to the device, wherein the tilter cap is connectable to the tilter mount. In another case, the tilter cap is operable to pre-tension the torsion spring component. In yet another alternative, the torsion spring component includes a tang at a first end thereof, and the connection is a female receptacle for receiving the tang.

In accordance with another embodiment of the present invention, a method of tensioning a tilting apparatus is provided. The method comprises coupling a first end of torsion spring to a connection of a tilter bar; inserting at least a portion of the torsion spring and the tilter bar into an opening of a tilter head, the opening being aligned along an axis; connecting a tilter cap to a second end of the torsion spring; partially inserting the tilter cap into the tilter head opening; and rotating the tilter cap to pre-tension the torsion spring.

In accordance with yet another embodiment of the present invention, a tilting apparatus is provided. The tilting apparatus comprises a tilter head, a tilter bar and a pair of torsion springs. The tilter head has an opening aligned along an axis. The tilter head adapted to be coupled to a first member. The tilter bar is received within the opening and is rotatable about the axis. The tilter bar is adapted to be coupled to a second member. A first one of the torsion springs is coupled between a first end of the tilter bar and the tilter head and a second one of the torsion springs is coupled between a second end of the tilter bar and the tilter head. The pair of torsion springs is adapted to provide torsional resistance between the first and second members.

In one alternative, the second member comprises a tilter mount. In another alternative, the tilting device further includes an assembly for adjusting the torsion of the pair of torsion springs. In this case, the assembly preferably includes a pair of tilter caps, each of the tilter caps having a receiver portion for engaging one of the torsion springs. Here the tilting apparatus may further comprise a tilter mount for connecting to a device, wherein the pair of tilter caps is connectable to the tilter mount.

In yet another alternative, the tilting device further comprises a locking means for preventing rotation of the tilter bar about the axis. In a further alternative, the tilting device further comprises a bushing at least partly enclosing a portion of the tilter bar and a set screw threadedly coupled with the tilter head. The set screw is adapted to impact the bushing and thereby limit rotation of the tilter bar.

In another alternative, the tilter head further includes a receptacle and the pair of torsion springs each including first and second tangs. The first tang of the first torsion spring is coupled to the first end of the tilter bar, the first tang of second torsion spring is coupled to the second end of the tilter bar, and the second tangs are each coupled to the receptacle. In one example, the receptacle comprises a recess. In another example, the receptacle comprises a slot.

In accordance with a further embodiment of the present invention, an adjustable extension arm for mounting a device is provided. The adjustable extension arm comprises first and second channel members, first and second endcaps, and a tilting apparatus. The first channel member has a first end, a second end opposite the first end, and a pair of sidewalls extending from the first end to the second end. The second channel member has a first end, a second end opposite the first end, and a pair of sidewalls extending from the first end to the second end. The first endcap has first and second ends. The first end of the first endcap is coupled to the first channel member about the first end thereof and to the second channel member about the first end thereof. The second end of the first endcap is attachable to a support. The second endcap has first and second ends. The first end of the second endcap is coupled to the first channel member about the second end thereof and to the second channel member about the second end thereof. The tilting apparatus includes a tilter head, a tilter bar and a pair of torsion springs. The tilter head is coupled to the second end of the second endcap. The tilter head also has an opening aligned along an axis. The tilter bar is received within the opening and is rotatable about the axis. The tilter bar is adapted to be coupled to the device. A first one of the torsion springs is coupled between a first end of the tilter bar and the tilter head. A second one of the torsion springs is coupled between a second end of the tilter bar and the tilter head.

In one alternative, the adjustable extension arm further comprises a forearm extension coupling the second endcap to the tilter head. In another alternative, the pair of torsion springs each has an adjustable tension. In this case, the tilting apparatus preferably further comprises a pair of tension mechanisms. A first one of the tension mechanisms is used for pre-tensioning the first torsion spring, and a second one of the tension mechanisms is used for pre-tensioning the second torsion spring. Here, the adjustable extension arm may further comprise a tilter mount for connecting to the device, wherein the first and second tension mechanisms are connectable to the tilter mount.

In accordance with a further embodiment of the present invention, a tilting apparatus for supporting a device is provided. The tilting apparatus comprises a tilter head, a tilter body rotationally coupled to the tilter head, and means for creating a torsional resistance between the tilter head and the tilter body.

BRIEF DESCRIPTION OF THE DRAWINGS

FIGS. 2(a)-(d) illustrate a detailed view of portions of the extension arm of FIG. 1.

FIGS. 6(a)-(g) illustrate views of a tilter head in accordance with an embodiment of the invention.

DETAILED DESCRIPTION

The aspects, features and advantages of the present invention will be appreciated when considered with reference to the following description of preferred embodiments and accompanying figures. In describing the preferred embodiments of the invention illustrated in the figures, specific terminology will be used for the sake of clarity. However, the invention is not intended to be limited to the specific terms so selected, and it is to be understood that each term selected includes all technical equivalents that operate in a similar manner to accomplish a similar purpose.

Figure 1:
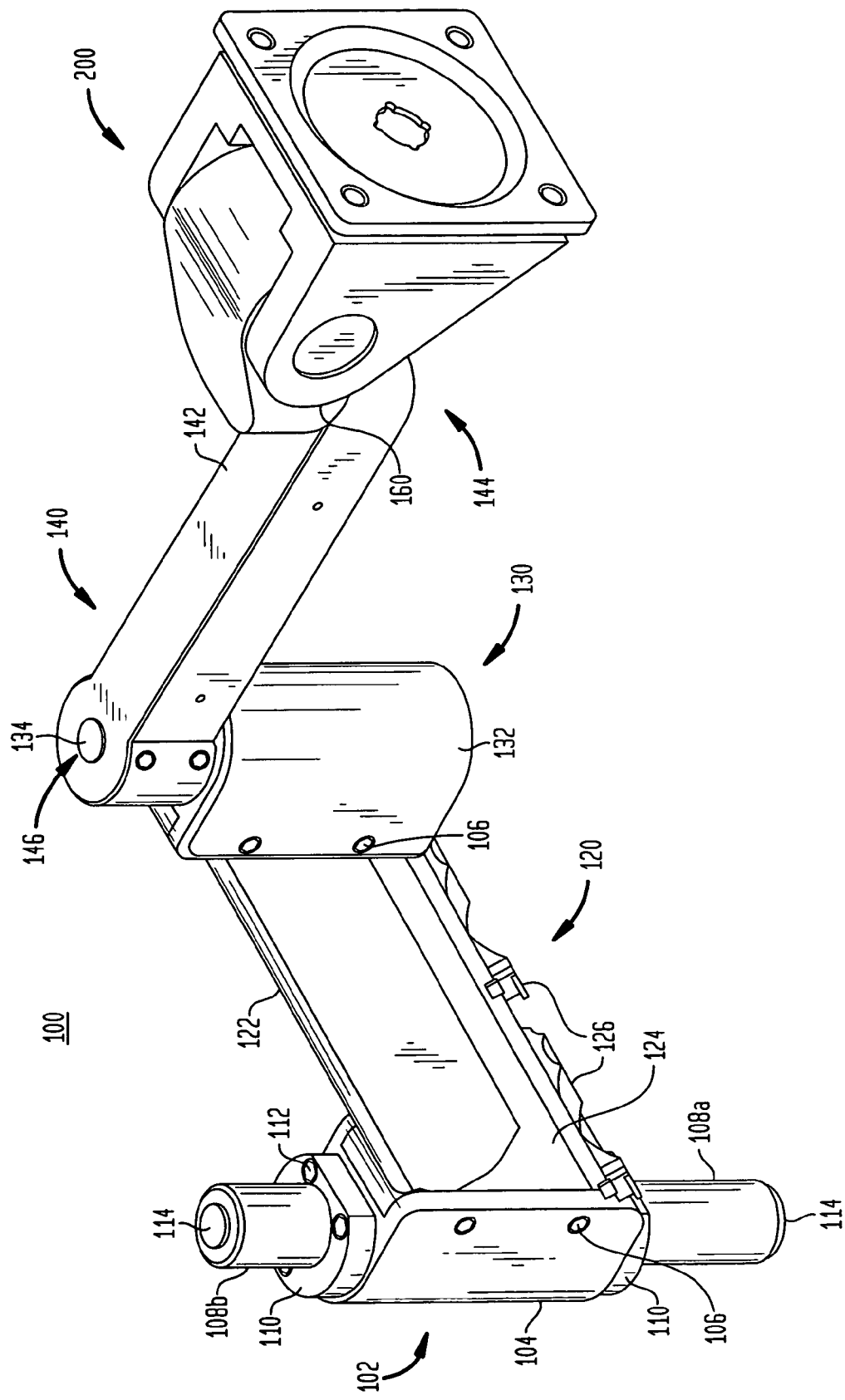
FIG. 1 illustrates an extension arm assembly connected to a tilting device for adjustably mounting an electronic device in accordance with an embodiment of the invention.

FIG. 1 illustrates an extension arm 100 connectable to a rail mount or other mount (not shown) at a first end and attached to a tiling device 200 at the other end. The tilting device 200 is adapted to attach to an electronic device, and provides a bias or counterbalance so that the electronic device can be readily maintained in a desired position. While the electronic device is described below as a flat screen monitor or other video monitor, the invention is not limited to use with such devices, and may be used with a wide variety of equipment. The features of the tilting device 200 will be explained in more detail below.

The extension arm 100 may be a conventional extension arm, and will now be described generally. Preferably, the extension arm 100 is one of the types fully described in above-referenced U.S. Pat. Nos. 6,409,134 and 6,478,274. As shown in FIG. 1, the extension arm 100 includes a first endcap 102, an arm 120, a second endcap 130 and a forearm extension 140.

The first endcap 102 includes a housing 104 attached to one end of the arm 120 by, for example, pins 106. At least one shaft 108 is adapted for connection to a mounting device. One such type of mounting device is the rail mount shown and described in U.S. patent application Ser. No. 10/461,635, filed on Jun. 13, 2003 and entitled "Rail Mounting Apparatus for Electronic Device," which is fully incorporated by reference herein. If the extension arm is connected to a rail mount, the shaft 108 preferably comprises a lower shaft 108a and an upper shaft 108b separately engaged to the housing 104. One or both of the lower shaft 108a and the upper shaft 108b may be integrally molded with an endwall of the housing 104. Alternatively, one or both of the lower shaft 108a and the upper shaft 108b may be secured to the housing 104 by sleeves 110. In this case, the sleeves 110 may be affixed to the top and bottom endwalls of the housing 104 by screws 112. The shaft 108 may be covered at either end by top hat plugs 114 to enhance the visual appearance.

The arm 120 is preferably formed of an upper housing 122 and a lower housing 124. The upper housing 122 and the lower housing 124 define a chamber therebetween containing an extension/retraction means, for instance, a gas spring (not shown). The gas spring is preferably adjustably mounted at one end within the first endcap 102 and at the other end to, for instance, a ball stud mounted within the upper housing 122. As shown in FIG. 1, the arm 120 may include one or more external cable ties 126 in order to secure the cable of an electronic device supported by the extension arm 100. Alternatively, the cable may be secured within the arm 120 as shown and described in U.S. Pat. No. 6,409,134. The second endcap 130 has a housing 132 attached to the second end of the arm 120 by, for example, pins 106. A shaft 134 preferably extends out of the top of the housing 132 and connects to the forearm extension 140.

A preferred embodiment of tilting device 200 is shown in FIGS. 2(a)-(d) mounted on an alternative forearm extension 140'. The forearm extension 140 and the forearm extension 1401 each includes a body 142 having end couplings 144 and 146 at opposite ends thereof. The shaft 134 is received within the end coupling 146, and the forearm extension 140 is rotatable about the shaft 134. A bushing (not shown) may be received within the end coupling 144. The tilting device 200 can be inserted into the bushing, and is rotatable within the end coupling 144. The forearm extension 140 (or forearm extension 1401) preferably has a locking mechanism for restricting movement of the tilting device 200 within the end coupling 144. The locking mechanism may be a set screw 148 that is insertable into a wall of the end coupling 144. See FIG. 2(d). When the set screw 148 is tightened, it causes the bushing to flex inward and frictionally engage the tilting device 200 and thus prevent the tilting device 200 from rotating within the end coupling 144.

The upper channel 122, the lower channel 124, the first endcap 102 and the second endcap 130 are configured so as to form an adjustable parallelogram. When so configured, the housing 104 of the first endcap 102 and the housing 132 of the second endcap 130 point in opposite directions. The shape of the parallelogram is retained by the gas spring within the chamber of the arm 120. Generally, the gas spring is sized so as to have a fixed length until an upward or downward force is exerted at the second endcap 130 that exceeds the gas spring's designed resistance. Thus, the gas spring retains the parallelogram shape when the only force exerted at the second endcap 130 is the weight of the flat screen device. However, the gas spring permits the parallelogram shape to be adjusted when a user pushes the flat screen device, which is preferably coupled to the forearm extension 140 by means of the tilting device 200, up or down.

Figure 3A:
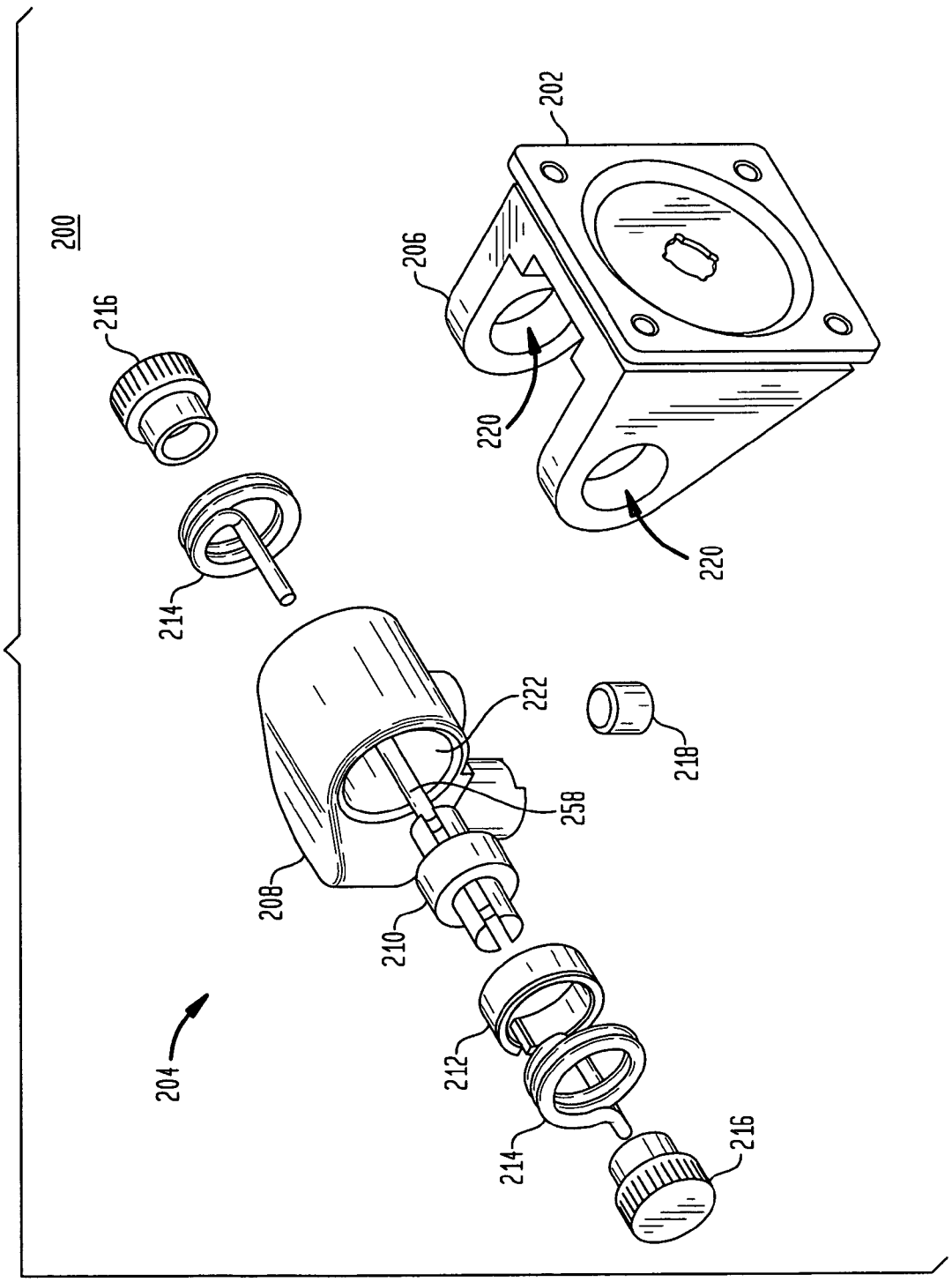
FIGS. 3(a)-(b) illustrate exploded and cutaway views of a tilter assembly in accordance with an embodiment of the invention.

An embodiment of the tilting device 200 is shown in more detail in FIGS. 3-4. FIG. 3A is an exploded view of the tilting device 200, which includes a rotatable adapter plate 202 and a tilter assembly 204. The tilter assembly 204 preferably includes a tilter mount 206, a tilter head 208, a tilter bar 210, a bushings 212, a pair of springs 214, a pair of tilter caps 216 and a locking mechanism 218.

Figure 3B:
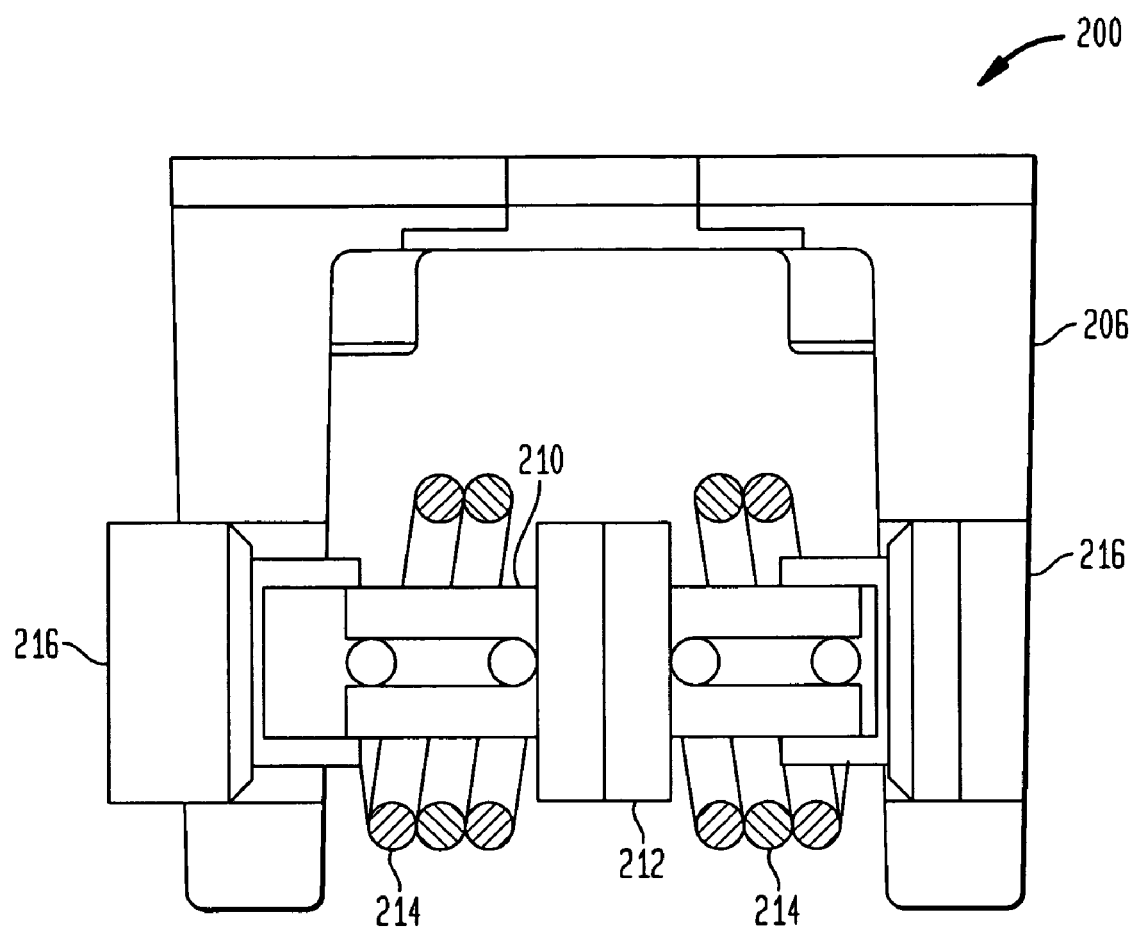
Figure 4A:
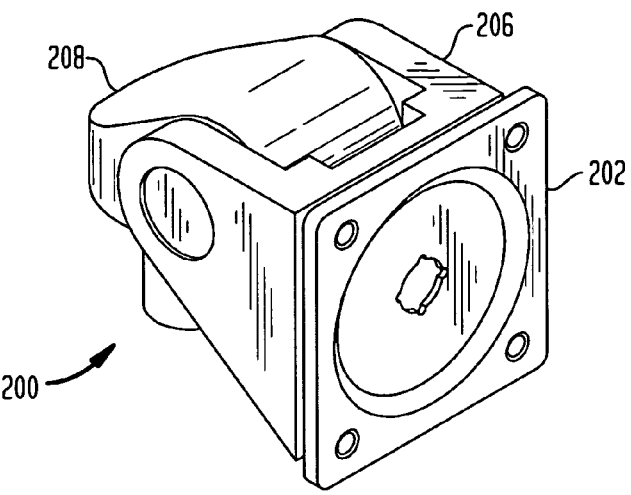
FIGS. 4(a)-(d) illustrate views of a tilter assembly in accordance with an embodiment of the invention.
Figure 4B:
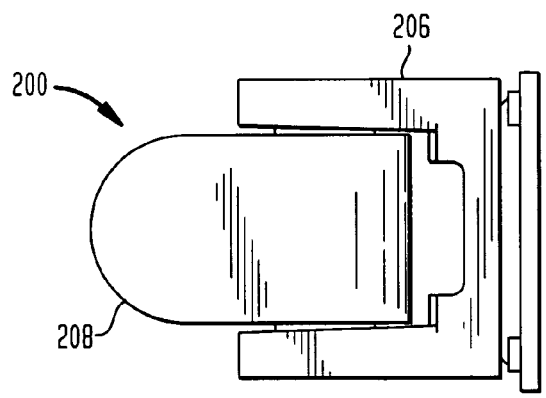
Figure 4C:
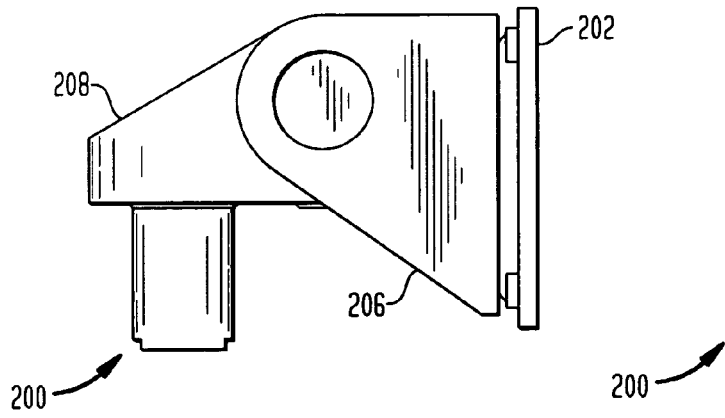
Figure 4D:
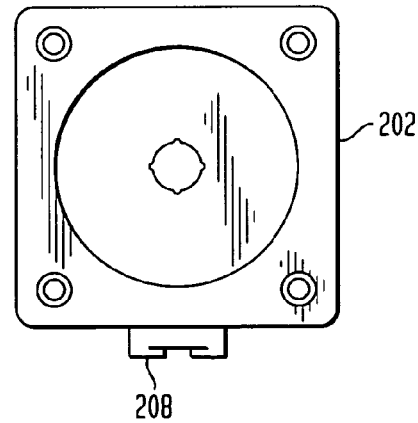

FIG. 3B illustrates one example of how the tilting device 200 may be assembled, omitting the tilter head 208 for ease of illustration. A central portion of the tilter bar 210 is received within the bushing 212. The springs 214 are connected to the tilter bar 210 on either side of the central portion. The assembled tilter bar 210, bushing 212 and spring(s) 214 may be inserted through one of the openings 220 of the tilter mount 206 (and into a central opening 222 of the tilter head 208). The tilter caps 216 can then be inserted into the openings 220, constraining the springs 214 in the tilter head 208. FIGS. 4(a)-(d) illustrate views of the fully assembled tilting device 200 according to a preferred embodiment of the present invention.

Figure 5A:
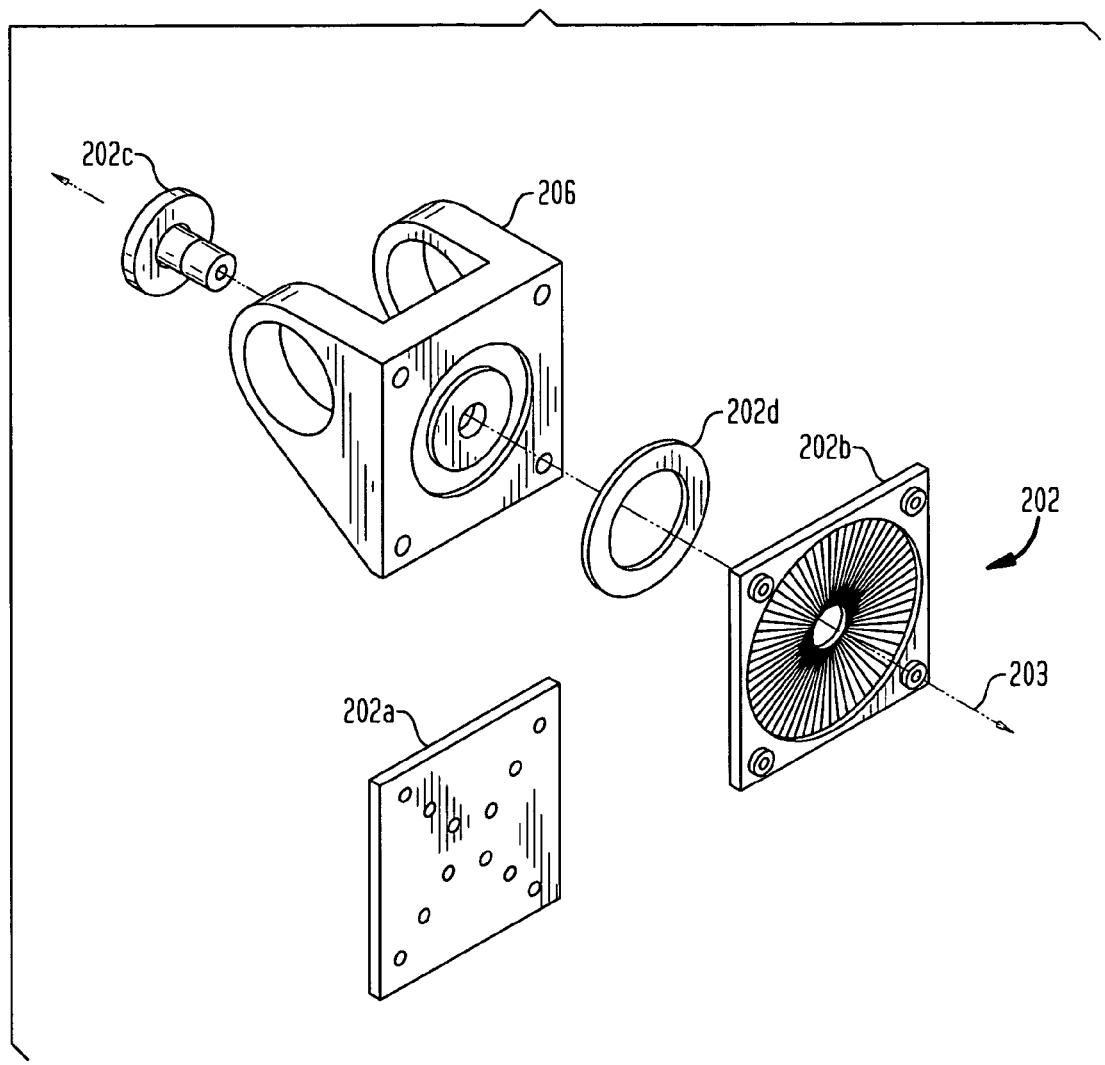
FIGS. 5(a)-(d) illustrate views of a tilter mount and adapter plate in accordance with an embodiment of the invention.

FIG. 5(a) illustrates an exploded view of the rotatable adapter plate 202 and the tilter mount 206. The adapter plate 202 and the tilter mount 206 may comprise known components, such as those shown and described in U.S. Pat. No. 6,505,988, entitled "Tilter for Positioning Electronic Devices," which is fully incorporated by reference herein.

The adapter plate 202 can preferably rotate about axis 203 to provide additional adjustability to the mounted monitor. In this case, the adapter plate 202 may include plate 202a that is fixed to the flat screen device and a rotating plate 202b that is attached to the tilter mount 206 by, for example, a rivet 202c. See FIG. 5(a). Preferably, before attaching the rotating plate 202b to the tilter mount 206, a washer 202d, such as a nylon washer, is disposed between the two. The plate 202a may be connected to the rotating plate 202b if the rotating plate 202b is part of the tilter configuration, or is connected directly to the tilter mount 206 if the rotating plate 202b is not part of the tilter configuration. The plate 202a may be connected to the tilter mount 206 with, for example, threaded fasteners (not shown).

Figure 5B:
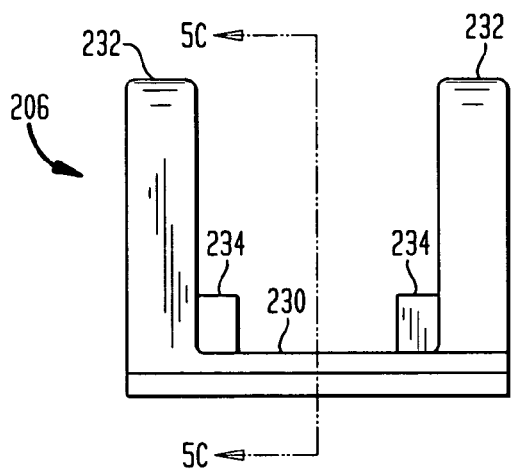
Figure 5C:
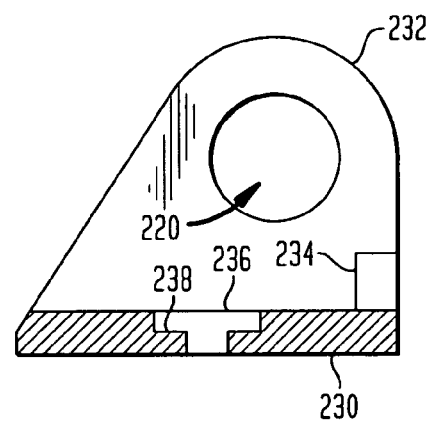
Figure 5D:
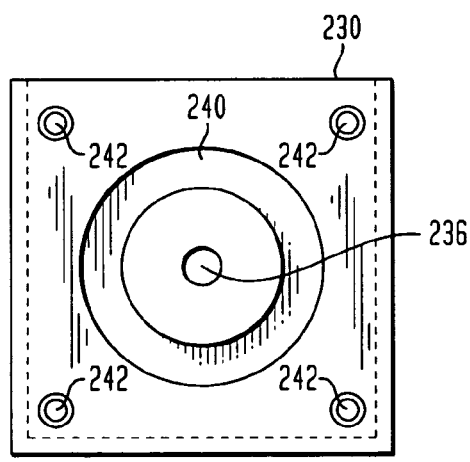
Figure 6F:
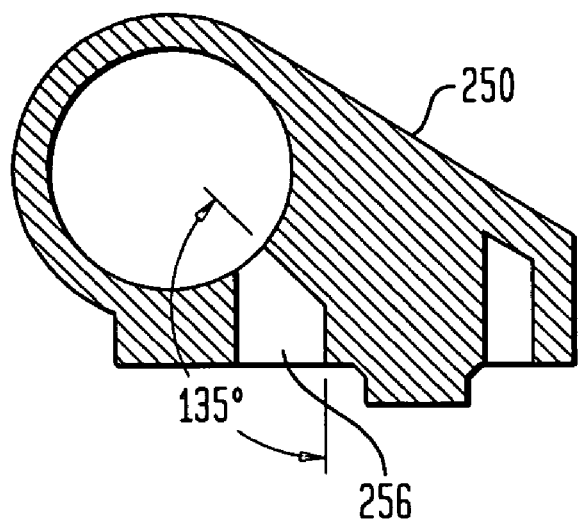

With reference to FIGS. 5(b)-(d), the tilter mount 206 is desirably cast from relatively lightweight, strong metal, such as aluminum. As shown in FIG. 5(b), the tilter mount 206 comprises a base 230 having a generally square shape, from which extend flanges 232. Stops 234, which are generally cubical shaped blocks, are formed on an inner surface of the base 230 adjacent to the flanges 232. The stops 234 serve to arrest the rotation of the tilter mount 206 in the negative direction about the axis A of the tilter head 208. See FIG. 6(a). As illustrated in FIGS. 3(a) and 5(c), the flanges 232 have the shaft holes 220 formed therein for accepting the tilter bar 210 and other components of the tilter assembly 204. The shaft holes 220 align with the central opening 222 of the tilter head 208 so as to form an extended tubular passageway. A rivet hole 236 extends through the center of the base 230. The rivet hole 236 includes a recessed portion 238 upon which a head of the rivet 202c may securely fit.

FIG. 5(d) illustrates that the base 230 also includes a shallow washer channel 240, capable of receiving the washer 202d. The shallow washer channel 240 preferably has a depth on the order of 0.01-0.02 inches. Additionally, mounting holes 242 are disposed near corners of the base 230 and extend into the flanges 232. The mounting holes 242 enable the tilter assembly 204 to be secured directly to the adapter plate 202 by fasteners.

FIGS. 6(a)-(g) illustrate views of the tilter head 208.

Figure 6G:
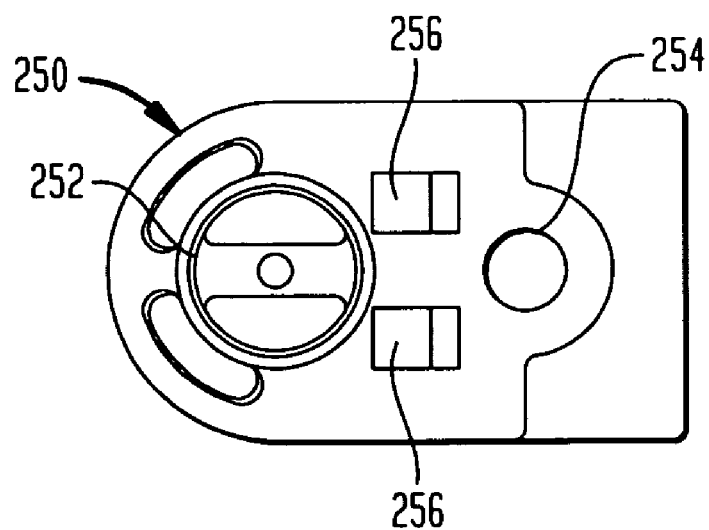

As seen in FIG. 6(a), the tilter head 208 includes a main body 250 and a shaft 252. The shaft 252 is insertable into the end coupling 144 of the forearm extension 140 or 140'. The shaft 252 is preferably rotatable in the end coupling 144. FIG. 6(a) also shows the axis A through the central opening 222 of the main body 250. A receptacle 254 is desirably provided as part of the main body 250 for receiving the locking mechanism 218. If the locking mechanism used is a set screw, the receptacle 254 may be threaded to receive the set screw. The threads of the set screw may be coated with nylon to securely engage the set screw with the receptacle 254. Alternatively, the locking mechanism 218 may be any other mechanism, for example, a latch, clasp, hasp or clamp, which performs the equivalent function to constrict rotation about the axis A. The outer portion adjacent to the receptacle 254 may be rounded, as seen in FIG. 6(g).

Returning to FIG. 6(a), the main body 250 preferably also includes one or more recesses 256 or other connection means for securing the springs 214, as will be discussed below. The recesses 256 may be holes extending through the main body 250. See FIG. 6(f). In an alternative embodiment shown in FIG. 3(a), the tilter head 208 may include a slot 258 in place of the recesses 256. The tilter head 208 is desirably fabricated from relatively lightweight, strong metal, such as steel or aluminum.

Figure 7A:
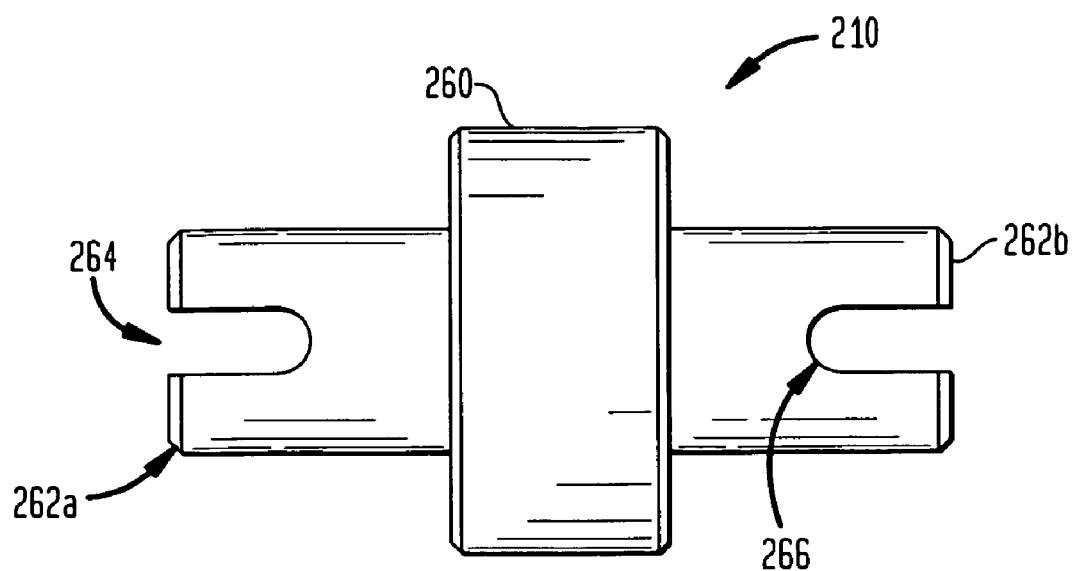
FIGS. 7(a)-(d) illustrate tilter bars in accordance with an embodiment of the invention.
Figure 7B:
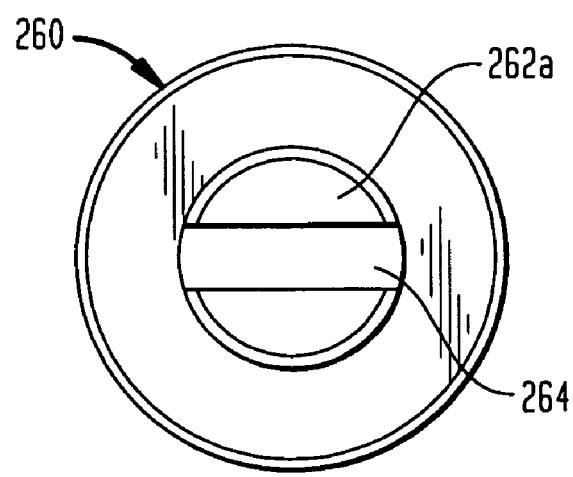

FIGS. 7(a)-(b) illustrate an embodiment of the tilter bar 210 in detail. As seen in FIG. 7(a), the tilter bar 210 has a cylindrical central portion 260 and a pair of arms 262a, b extending on either side of the central portion 260. The arms 262a,b preferably each include a recess or slot 264, or other engagement means for contacting one of the springs 214. Other means for contacting the springs 214 include, for example, a hole formed transversely through the arm 262a or 262b, a hook, a clasp, a hasp, a clip, adhesive material, etc. The innermost portions of the recesses 264 may have a curved or rounded end 266 adapted to receive a portion of the spring 214. As seen in FIG. 7(b), the central portion 260 desirably has a larger diameter than the diameter of the arms 262a,b. The arms 262a,b are preferably identical. The tilter bar 210 is preferably formed from a metal, for instance steel or aluminum. While the tilter bar 210 as shown includes the pair of arms 262a,b, it should be understood that the tilter bar 210 may include a single arm for connecting to one or more springs 214. Alternatively, the tilter bar 210 may be formed so that the central portion 260 and the arms 262a,b are combined into a uniform component having substantially the same diameter along its length.

Figure 7C:
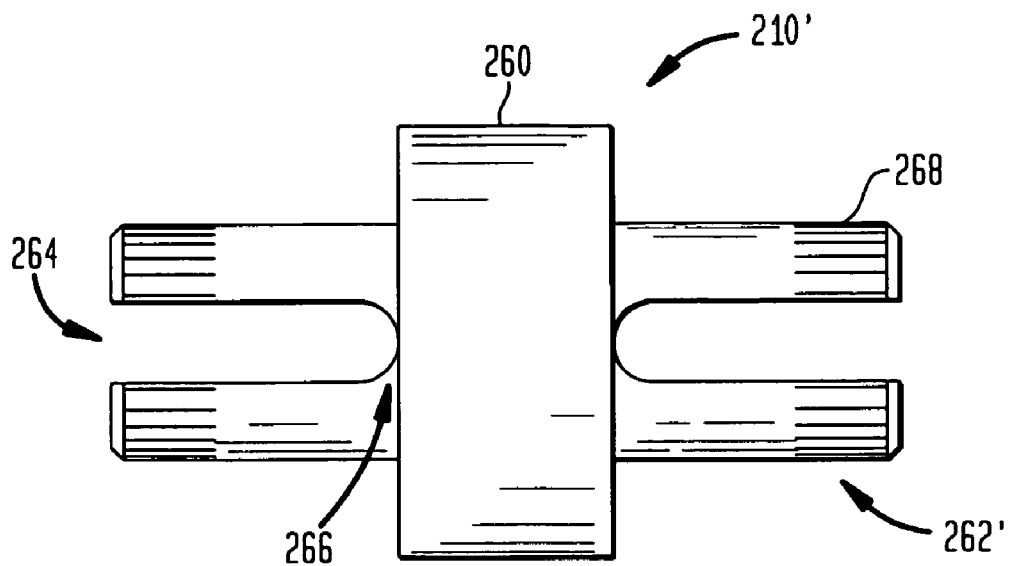
Figure 7D:
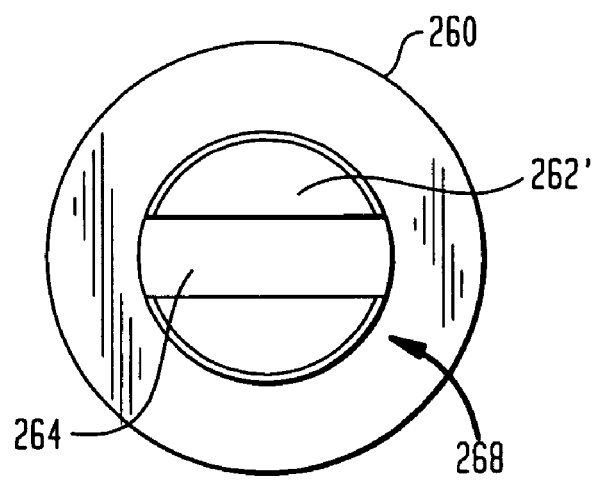

FIGS. 7(c)-(d) illustrate another tilter bar, namely tilter bar 210'. As with the tilter bar 210, the tilter bar 210' includes a central portion 260 and a pair of arms 262' extending on either side of the central portion 260. The arms 262' preferably each include the recess 264 or other engagement means for contacting one of the springs 214. The recesses 264 of FIG. 7(c) preferably extend substantially the entire length of the arms 262'. The innermost portions of the recesses 264 may have the curved or rounded end 266 adapted to receive a portion of the spring 214. The ends of the arms 262 also include knurling 268. The knurling 268 can provide friction when engaging the tilter caps 216, as will be described below. As with the tilter bar 210, the tilter bar 210' is preferably formed from a metal, for instance steel or aluminum.

FIGS. 8-10 illustrate several exemplary spring configurations that can be used in accordance with embodiments of the present invention. The springs 214 are preferably torsion springs. The springs 214 provide a counterbalance or bias to ensure that a heavy and/or bulky electronic device does not cause the adapter plate 202 to rotate about the axis A even though the locking mechanism 218 is engaged. Preferably two or more springs 214 are employed.

As seen in FIGS. 8-10, the springs 214 may include different kinds of springs 214a, 214b and 214c, which may be selected, for instance, depending upon the weight of the electronic device attached to the adapter plate 202. The springs 214a, b, c may have different spring tensions. The springs 214 are preferably made from steel wire. The wire diameter may be selected depending upon various factors such as desired spring tension, durability, cost of materials, etc. By way of example only, the diameter may be between 0.075 and 0.125 inches. The springs 214 may be viewed generally as a biasing or torsional resistance device, and other devices or structures capable of providing such biasing may be using in place of or complementary with the springs 214.

Figure 8A:
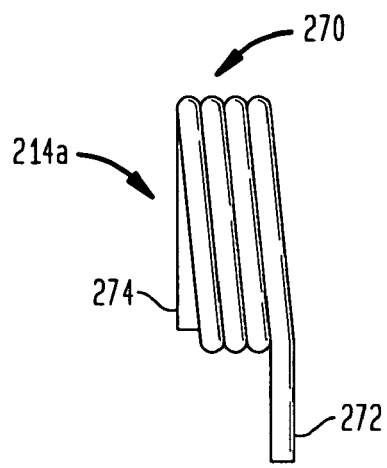
FIGS. 8(a)-(d) illustrate a torsion spring in accordance with an embodiment of the invention.
Figure 8B:
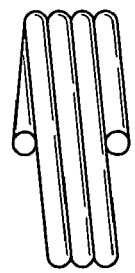

FIGS. 8(a)-(d) illustrate spring 214a, which includes a central portion 270 and a pair of tangs 272, 274. The central portion 270 is preferably helical and includes a number of windings. The number of turns or windings may be selected to achieve a desired spring tension. The pair of tangs 272, 274 preferably face or point in the same direction. As seen in FIG. 8(b), the spring 214a preferably includes 3.5 turns. In an alternative, the spring 214a includes at least 2.0 turns. In another alternative, the spring 214a includes no more than 5.0 turns. The wire preferably has a diameter between 0.1 and 0.08 inches, more preferably on the order of 3/32 of an inch. When a pair of springs 214a are used with the arms 262a and 262b, the springs 214a are preferably wound in opposite directions. For instance, the spring 214a shown in FIG. 8 is a "right hand" wound spring. A mirror image version of the spring 214b would be a "left hand" wound spring. In operating the right hand wound spring may be connected to the right hand arm of the tilter bar (e.g., arm 262b), and the left hand wound spring may be connected to the left hand arm of the tilter bar (e.g., arm 262a).

Figure 8C:
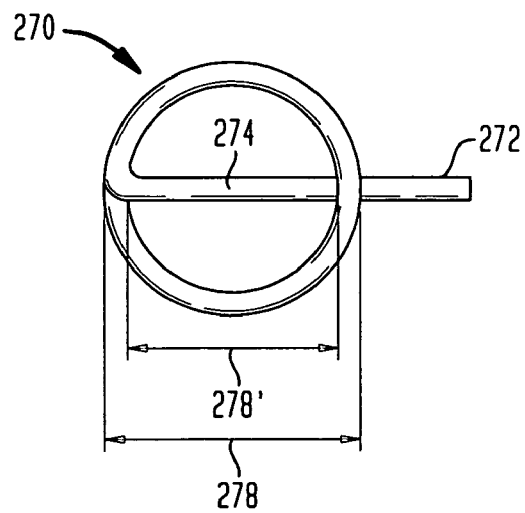
Figure 8D:
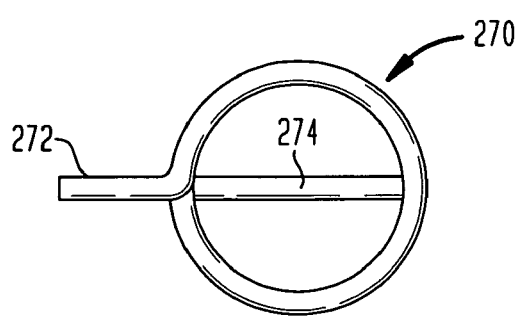

Depending on the thickness of the material and the number of turns, the central portion 270 has a thickness 276. As seen in FIG. 8(c), the central portion 270 has an outer diameter 278 and an inner diameter 278'. The inner diameter 278' of the central portion 270 is greater than the diameter of the arm 262a or 262b on which it will be placed. During manufacture of the tilter assembly 204, the tang 274 is inserted into one of the recesses 264 of the tilter bar 210. The central portion 270 is received around the arm 262a or 262b. The tang 272 sticks out and preferably does not contact the arm 262a or 262b.

Figure 9A:
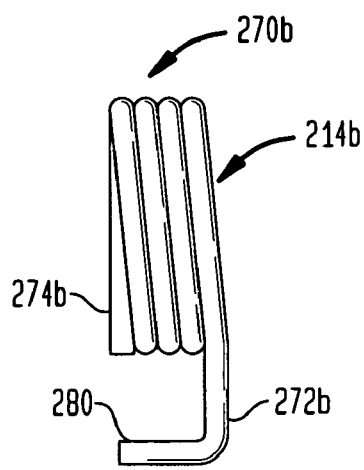
FIGS. 9(a)-(d) illustrate another torsion spring in accordance with another embodiment of the invention.
Figure 9B:
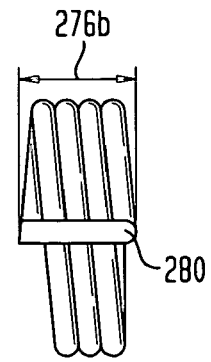

FIGS. 9(a)-(d) illustrate spring 214b, which includes a central portion 270b and a pair of tangs 272b and 274b. The central portion 270b is preferably helical and includes a number of windings. The number of turns or windings may be selected to achieve a desired spring tension. The tang 272b preferably includes an angled or hooked end 280. As seen in FIG. 9(b), the spring 214b preferably includes 3.5 turns. In an alternative, the spring 214b includes at least 2.0 turns. In another alternative, the spring 214b includes no more than 5.0 turns. The wire preferably has a diameter on the order of 0.075 to 0.080 inches. When a pair of springs 214b are used with the arms 262a and 262b, the springs 214b are preferably wound in opposite directions.

Figure 9C:
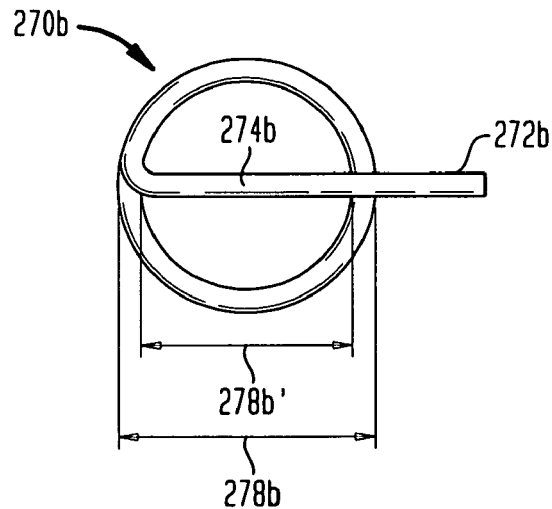
Figure 9D:
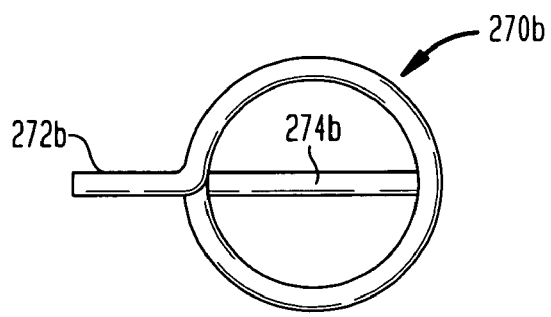

Depending on the thickness of the material and the number of turns, the central portion 270b has a thickness 276b. As seen in FIG. 9(c), the central portion 270b has an outer diameter 278b and an inner diameter 278b'. The inner diameter 278b of the central portion 270b is greater than the diameter of the arm 262a or 262b on which it will be placed. During manufacture of the tilter assembly 204, the tang 274b is inserted into one of the recesses 264 of the tilter bar 210. The central portion 270b is received around the arm 262a or 262b. The tang 272b sticks out and the angled or hooked end 280 preferably does not contact the arm 262a or 262b.

Figure 10A:
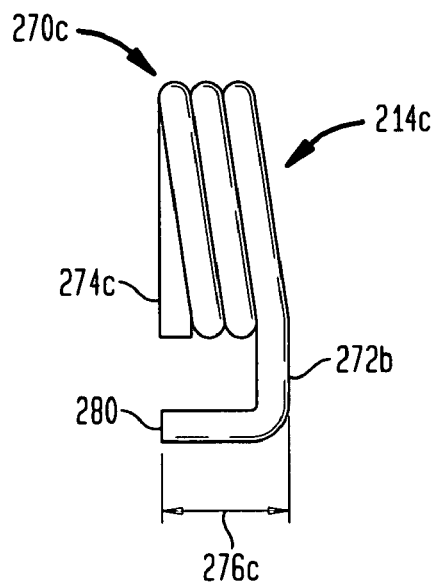
FIGS. 10(a)-(d) illustrate yet another torsion spring in accordance with a further embodiment of the invention.
Figure 10B:
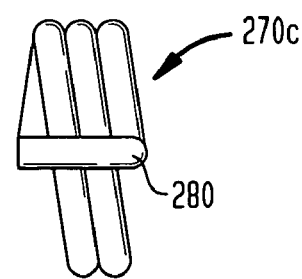

FIGS. 10(a)-(d) illustrate spring 214c, which includes a central portion 270c and a pair of tangs 272c and 274c. The central portion 270c is preferably helical and includes a number of windings. The number of turns or windings may be selected to achieve a desired spring tension. As with the tang 272b, the tang 272c preferably includes an angled or hooked end 280. As seen in FIG. 10(b), the spring 214c preferably includes 2.5 turns. In an alternative, the spring 214b includes at least 1.0 turns. In another alternative, the spring 214c includes no more than 4.0 turns. The wire preferably has a diameter on the order of 0.10 to 0.15 inches, more preferably about 0.125 inches. When a pair of springs 214c are used with the arms 262a and 262b, the springs 214c are preferably wound in opposite directions.

Figure 10C:
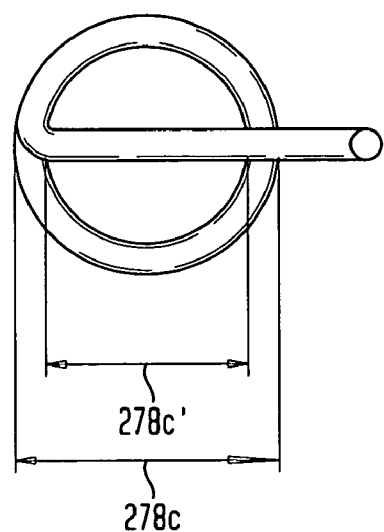
Figure 10D:
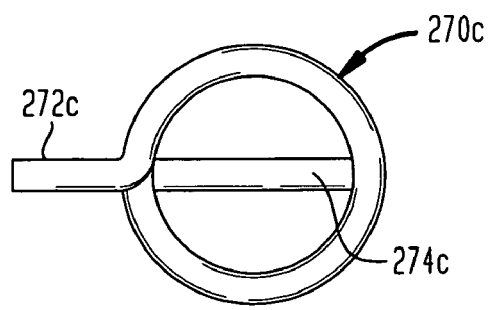

Depending on the thickness of the material and the number of turns, the central portion 270c has a thickness 276c. As seen in FIG. 10(c), the central portion 270c has an outer diameter 278c and an inner diameter 278c'. The inner diameter 278c' of the central portion 270c is greater than the diameter of the arm 262a or 262b on which it will be placed. During manufacture of the tilter assembly 204, the tang 274c is inserted into one of the recesses 264 of the tilter bar 210. The central portion 270c is received around the arm 262a or 262b. The tang 272c sticks out and the angled or hooked end 280 preferably does not contact the arm 262a or 262b.

Figure 11A:
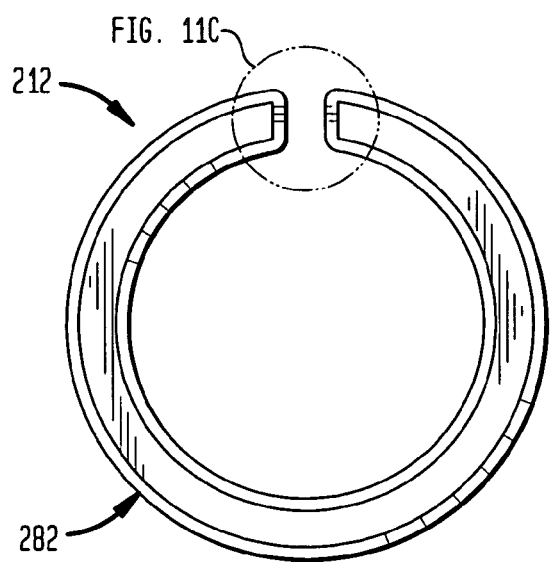
FIGS. 11(a)-(c) illustrate a bushing in accordance with an embodiment of the invention.
Figure 11B:
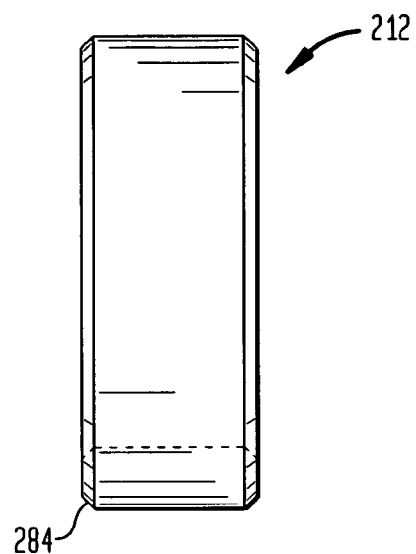
Figure 11C:
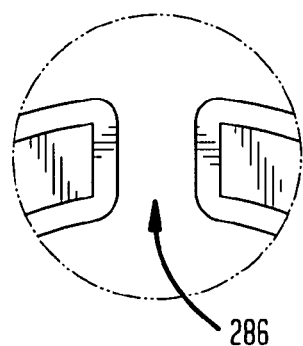

FIGS. 11(a)-(c) illustrate the bushing 212. As seen in FIG. 11(a), the bushing 212 comprises a ring 282. The ring 282 may have beveled edges 284. See FIG. 11(b). The ring 282 preferably includes a slot 286 provided along its sidewall, as shown in FIGS. 11(a) and 11(c). Desirably, the slot 286 extends the entire length of the sidewall such that the ring 282 has a non-closed annular shape. The bushing 212 is preferably a metal such as bronze. As discussed above in relation to FIGS. 3(a)-(b), the bushing 212 is inserted over the central portion 260 of the tilter bar 210. The slot 286 of the bushing 212 is preferably offset from the set screw 218. For enhanced compression of the bushing 212, the slot 286 is desirably offset from the set screw 218 by about 90 degrees, plus or minus about 15 degrees.

After the bushing 212 is inserted, the springs 214 can be connected to the arms 262a,b. Once the springs 214 are coupled to the tilter bar 210, the tilter bar 210, the bushing 212 and the spring 214 are inserted into the central opening 222 of the tilter head 208. The tang(s) 272 of the spring(s) 214a preferably fits into the recess(es) 256 of the tilter head 208. See FIG. 6(a). If springs of the types shown in FIGS. 9-10 are used, the angled or hooked ends 280 preferably fit into the slot 258. See FIG. 3(a).

Figure 12A:
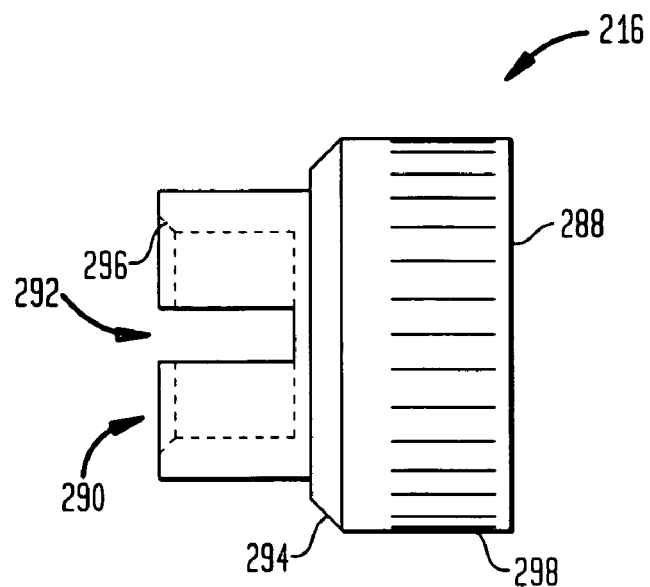
FIGS. 12(a)-(d) illustrate tilter bar endcaps in accordance with embodiments of the invention.
Figure 12B:
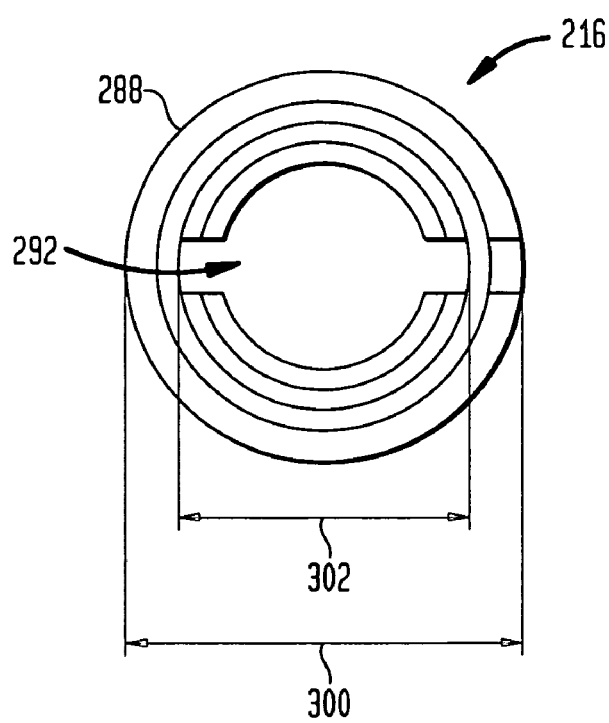

FIGS. 12(a)-(b) illustrate a preferred embodiment of the tilter cap 216. The tilter cap 216 desirably includes a knob 288 and a receiver portion 290. The receiver portion 290 includes a recess or slot 292, or other engagement means for contacting the tang 272 of one of the springs 214. Other means for contacting one of the springs 214 include, for example, a hole formed transversely through the receiver portion 292, a hook, a clasp, a hasp, a clip, adhesive material, etc. The knob 288 may have an exterior beveled edge 294, and the receiver portion 290 may include an interior beveled edge 296. The knob 288 desirably includes knurling 298. The knob 288 has an outer diameter 300 preferably sized to securely fit into the shaft hole 220 of the tilter mount 206. For example, the knob 288 is preferably friction fit into the shaft hole 220. Alternatively, the knob 288 may be secured to the tilter mount 206 by other means, such as by a set screw or other fastening mechanism. The receiver portion 290 has an outer diameter 302 that is preferably smaller than the inner diameter 278' of the central portion 270.

Once the tilter bar 210, bushing 212, the springs 214 are inserted into the central opening 222 of the tilter head 208 and the shaft holes 220 of the tilter mount 206 are properly aligned along axis A, the tilter caps 216 can be connected as part of the tilter assembly 204. The tang 272 is engaged by the recess or slot 292. The receiver portion 290 preferably fits into the inner diameter 278' of the central portion 270.

Prior to full insertion of the tilter cap 216 into the shaft hole 220, the knob 288 may be turned to pre-tension the spring 214, providing torsional resistance. After pre-tensioning, the tilter cap 216 may be partially inserted, or fully inserted into the shaft hole 220 so that the exterior of the knob 288 is flush with or slightly recessed relative to the exterior of the flange 232. See FIG. 4(a). Upon insertion, the tilter cap 216 securely maintains the torsion spring 214 within the tilter assembly 204. Preferably the tilter cap 216 ensures that the tilter mount 206 is secured or otherwise engaged with the remainder of the tilter assembly 204. More preferably, the knurls 298 of the knob 288 permit a permanent fit of the tilter cap 216 into the tilter mount 206. Because the torsion spring 214 is coupled to the tilter mount 206, the flat panel device (which is preferably coupled to the tilter mount 206 by the adapter plate 202) is prevented from rotating about the axis A of the tilter head 208.

Figure 12C:
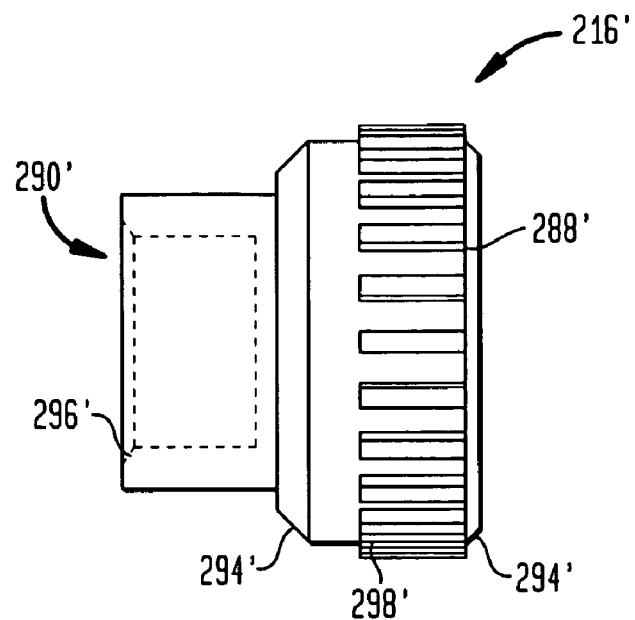
Figure 12D:
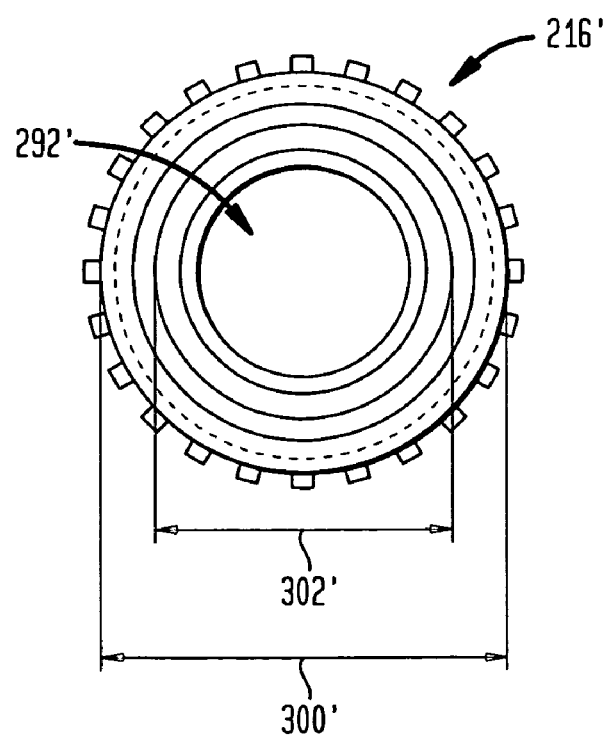

FIGS. 12(c)-(d) illustrate another embodiment of the tilter cap 216 for use with the spring 214b or 214c, namely tilter cap 216'. The tilter cap 216' may include a knob 288' and a receiver portion 290'. The receiver portion 290' includes a central recess or opening 292', or other engagement means for contacting the arm 262 (e.g., arm 262b). The knob 288' may have an exterior beveled edge 294', and the receiver portion 290' may include an interior beveled edge 296'. The knob 288' desirably includes knurling 298'. The knob 288' has an outer diameter 300' that is preferably sized to securely fit into the shaft hole 220 of the tilter mount 206. For example, the knob 288' is preferably friction fit into the shaft hole 220. Alternatively, the knob 288' may be secured to the tilter mount 206 by other means, such as by a set screw or other fastening mechanism. The receiver portion 290' has an outer diameter 302' that is preferably smaller than the inner diameter 278' of the central portion 270.

Once the tilter bar 210, bushing 212, the springs 214 are inserted into the central opening 222 of the tilter head 208 and the shaft holes 220 of the tilter mount 206 are properly aligned along axis A, the tilter caps 216' can be connected as part of the tilter assembly 204. Unlike the tilter cap 216, the tang 272b or 272c is not engaged by the central recess or opening 292'. Instead, as discussed earlier, the angled or hooked end 280 of the tang 272b or 272c preferably fits into the slot 258 of the tilter head 208. The receiver portion 290' preferably fits into the inner diameter 278' of the central portion 270. The central recess or opening 292' fits over the end of the arm 262.

Prior to full insertion of the tilter cap 216' into the shaft hole 220, the knob 288' may be turned to pre-tension the spring 214, providing torsional resistance. The knurling 268 of the arm 262 can provide friction when engaging the central recess or opening 292' of the tilter cap 216. This helps to prevent unwanted rotation of the tilter bar 210. After pre-tensioning, the tilter cap 216' may be partially or fully inserted into the shaft hole 220 so that the exterior of the knob 288' is flush with or slightly recessed to the exterior of the flange 232. Upon insertion, the tilter cap 216' securely maintains the spring 214b or spring 214c within the tilter assembly 204. Preferably the tilter cap 216' ensures that the tilter mount 206 is secured or otherwise engaged with the remainder of the tilter assembly 204. More preferably, the knurls 298' of the knob 288' permit a permanent fit of the tilter cap 216 into the tilter mount 206. Because the torsion spring 214 is coupled to the tilter mount 206, the flat panel device (which is coupled to the tilter mount 206 by the adapter plate 202) is prevented from rotating about the axis A of the tilter head 208.

At this point, the locking mechanism 218 can engage the tilter head 208. For instance, when the locking mechanism 218 is a set screw, once the set screw fully engages the receptacle 254, it can contact the bushing 212 and compress the slot 286. This compression restricts rotation of the tilter bar 210 about the A axis.

The spring(s) 214 provide a counterbalance or bias to ensure that a heavy and/or bulky electronic device does not cause the adapter plate 202 to rotate about the A axis even though the locking mechanism 218 is engaged. The spring(s) 214 may be selected depending upon the weight of the electronic device attached to the adapter plate 202.

Figure 13A:
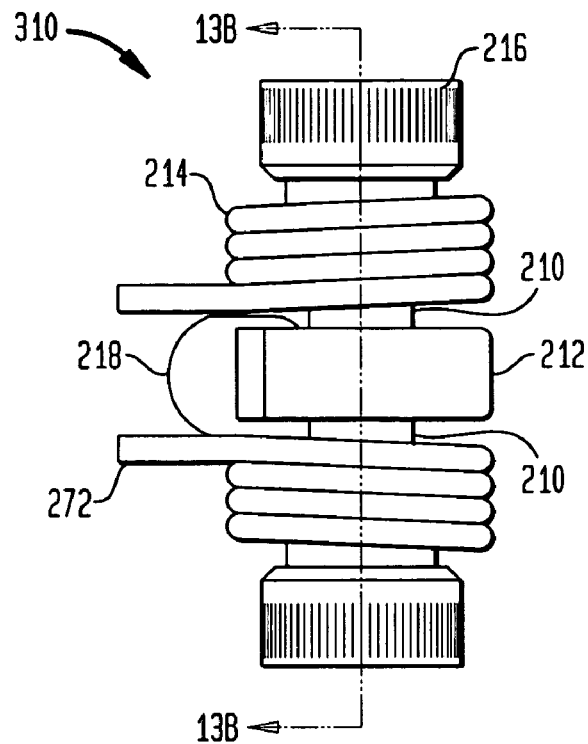
FIGS. 13(a)-(e) illustrate a tilter bar assembly in accordance with an embodiment of the invention.
Figure 13B:
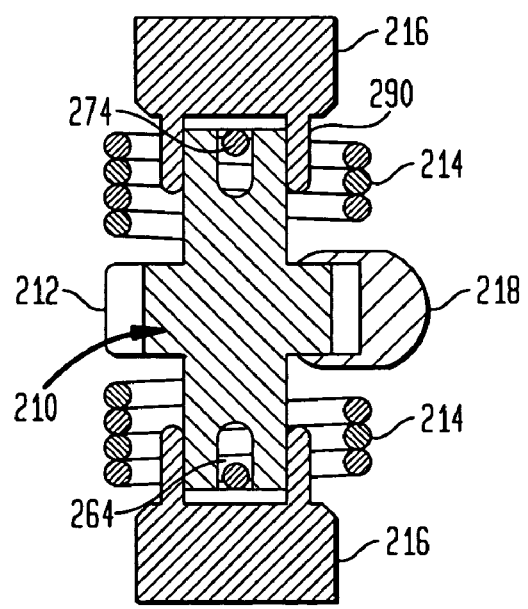
Figure 13C:
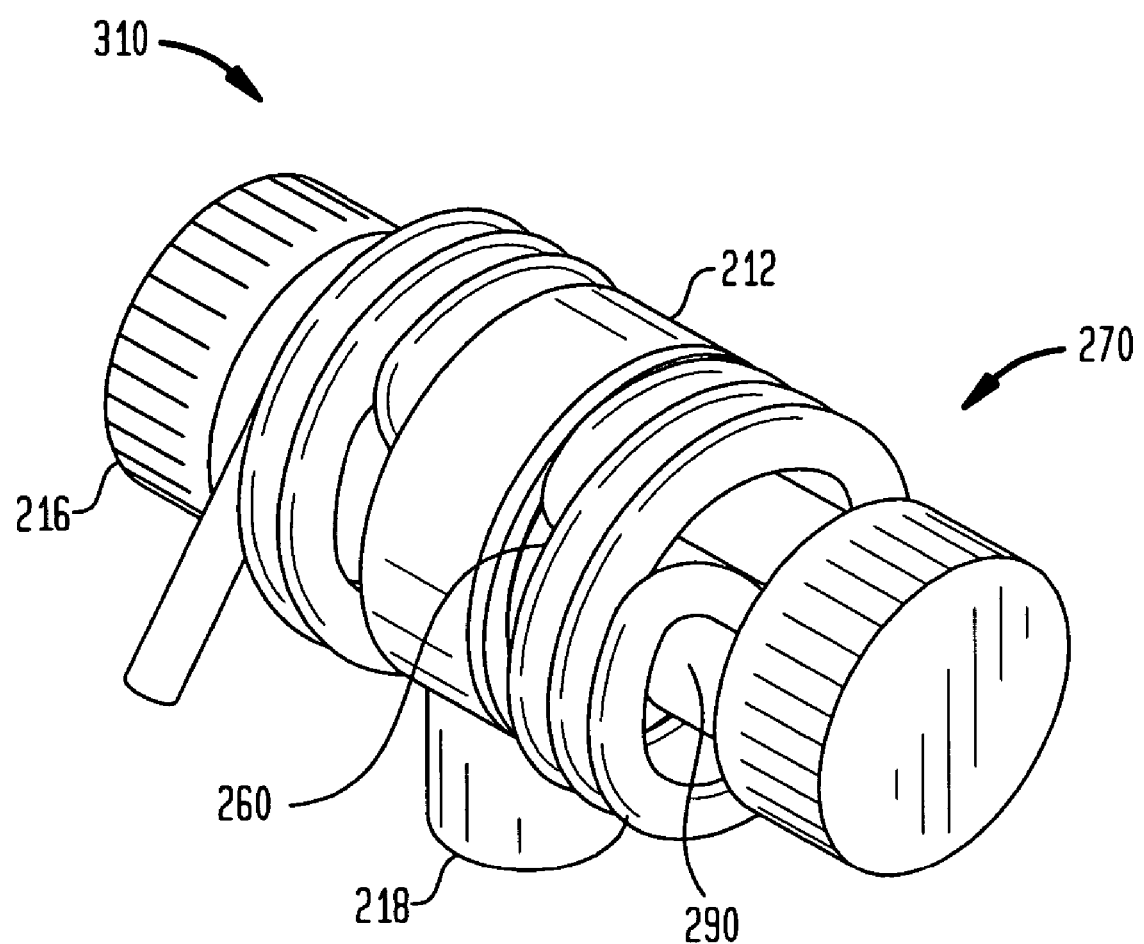
Figure 13D:
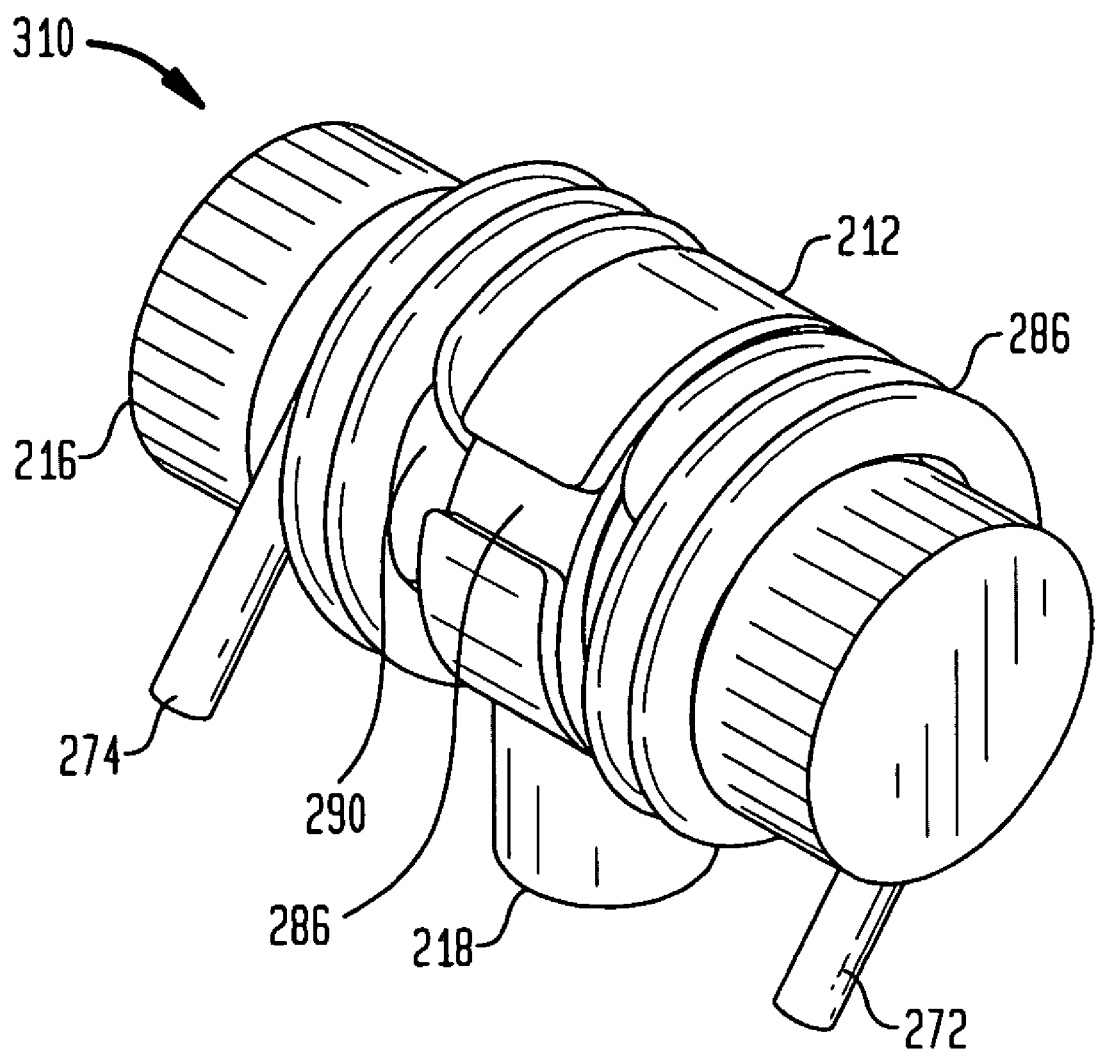
Figure 13E:
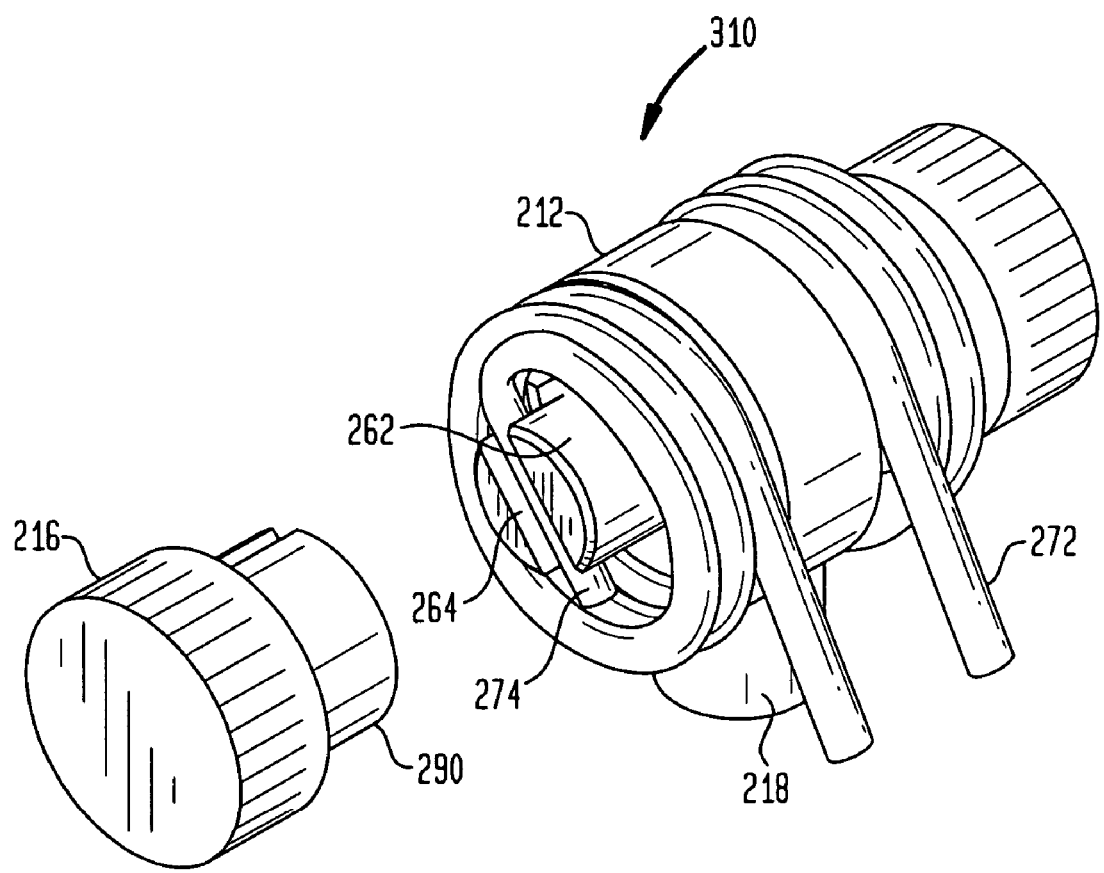

FIGS. 13(a)-(e) illustrate the tilter bar 210, the bushings 212, the springs 214, the pair of tilter caps 216 and the locking mechanism 218 configured together as a tilter bar assembly 310. As seen in FIG. 13(b), the tang 274 is received within the recess or slot 264, and the receiver portion 290 fits into the inner diameter 278' of the central portion 270. As seen in FIG. 13(d), set screw 218 engages the bushing 212, which compresses the slot 286 to restrict movement of the tilter bar 210. FIG. 13(e) shows how the tang 274 is received by the recess or slot 264 of the arm 262.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An adjustable extension arm for mounting a device, comprising:
   a first channel member having a first end, a second end opposite the first end, and a pair of sidewalls extending from the first end to the second end;
   a second channel member having a first end, a second end opposite the first end, and a pair of sidewalls extending from the first end to the second end;
   a first endcap having first and second ends, the first end of the first endcap being coupled to the first channel member about the first end thereof and to the second channel member about the first end thereof, and the second end of the first endcap being attachable to a support;
   a second endcap having first and second ends, the first end of the second endcap being coupled to the first channel member about the second end thereof and to the second channel member about the second end thereof; and
   a tilting apparatus comprising:
      a tilter head having a main body and a shaft, the shaft including a first end secured to the main body and a second end coupled to the second end of the second endcap, the tilter head being rotatable relative to the second end of the second endcap about a first axis, and the main body of the tilter head having an opening aligned along a second axis;
      a tilter bar received within the opening and rotatable about the second axis, the tilter bar adapted to be coupled to the device; and
      a pair of torsion springs, a first one of the torsion springs coupled between a first end of the tilter bar and the tilter head, and a second one of the torsion springs coupled between a second end of the tilter bar and the tilter head;
      wherein each torsion spring is received within the opening of the tilter head.

2. The adjustable extension arm of claim 1, further comprising a forearm extension coupling the second endcap to the tilter head.

3. The adjustable extension arm of claim 1, wherein the pair of torsion springs each has an adjustable tension.

4. An adjustable extension arm for mounting a device, comprising:
   a first channel member having a first end, a second end opposite the first end, and a pair of sidewalls extending from the first end to the second end;
   a second channel member having a first end, a second end opposite the first end, and a pair of sidewalls extending from the first end to the second end;
   a first endcap having first and second ends, the first end of the first endcap being coupled to the first channel member about the first end thereof and to the second channel member about the first end thereof, and the second end of the first endcap being attachable to a support;
   a second endcap having first and second ends, the first end of the second endcap being coupled to the first channel member about the second end thereof and to the second channel member about the second end thereof; and
   a tilting apparatus comprising:
      a tilter head coupled to the second end of the second endcap, the tilter head having an opening aligned along an axis;
      a tilter bar received within the opening and rotatable about the axis, the tilter bar adapted to be coupled to the device;
      a pair of torsion springs, a first one of the torsion springs coupled between a first end of the tilter bar and the tilter head, and a second one of the torsion springs coupled between a second end of the tilter bar and the tilter head; and
      a pair of tension mechanisms;
         wherein each torsion spring is received within the opening of the tilter head, each torsion spring has an adjustable tension, and a first one of the tension mechanisms is for pre-tensioning the first one of the torsion springs, and a second one of the tension mechanisms is for pre-tensioning the second one of the torsion springs.

5. The adjustable extension arm of claim 4, further comprising a tilter mount for connecting to the device, wherein the first and second tension mechanisms are connectable to the tilter mount.

6. The adjustable extension arm of claim 1, further comprising a bushing received within the opening and at least partly enclosing the tilter bar.

7. The adjustable extension arm of claim 6, further comprising a set screw threadedly coupled with the tilter head, and when the set screw engages the bushing, the set screw compresses the bushing against the tilter bar to limit rotation of the tilter bar about the second axis.

8. The adjustable extension arm of claim 1, further including an assembly for adjusting the torsion of the pair of torsion springs.

9. The adjustable extension arm of claim 8, wherein the assembly includes a pair of tilter caps, each of the tilter caps having a receiving portion for engaging one of the torsion springs.

* * * * *